Jan. 15, 1946.  E. M. MOREHOUSE  2,393,054
SELF LOCKING NUT
Filed Oct. 31, 1944  2 Sheets-Sheet 1
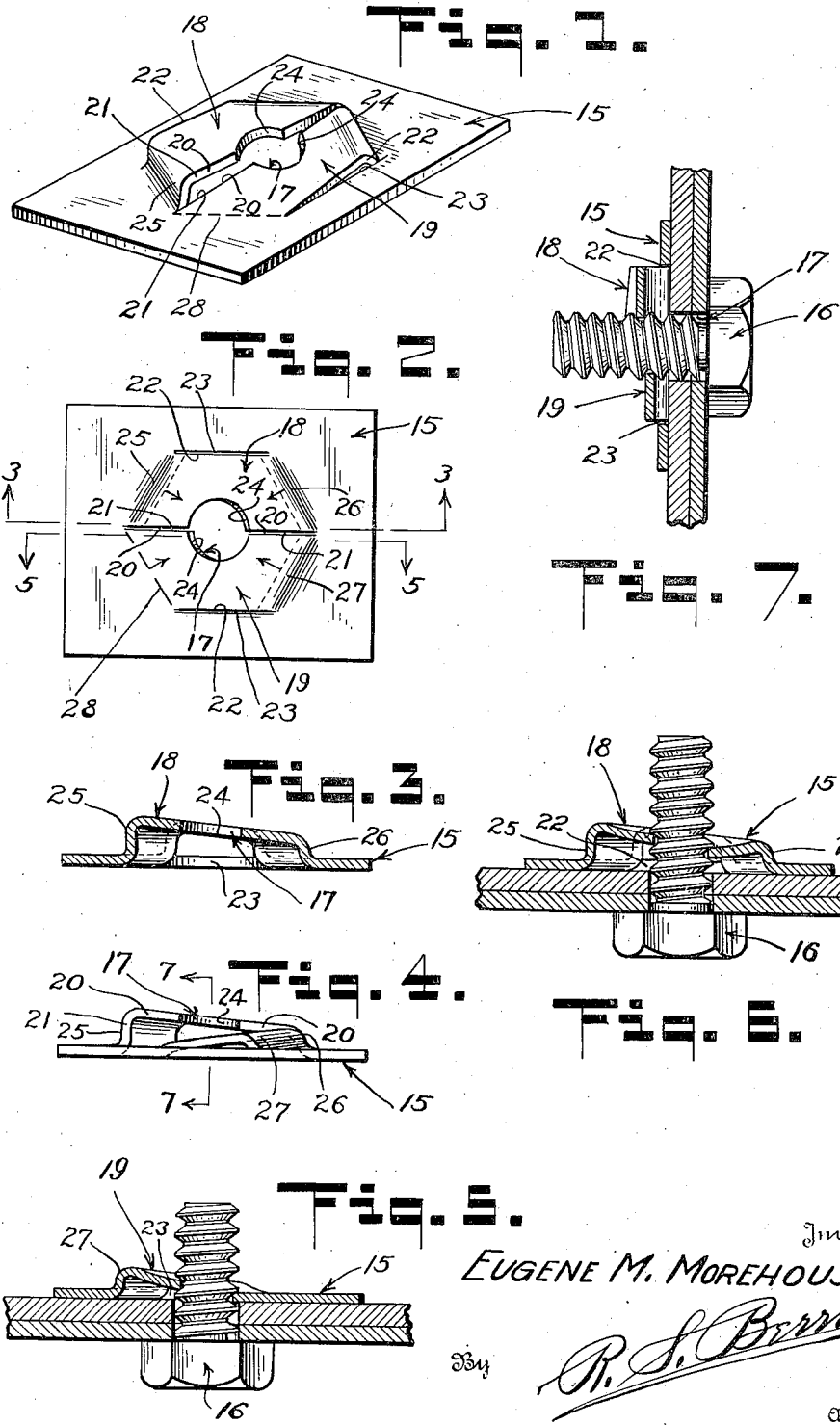
Inventor
EUGENE M. MOREHOUSE
By R. S. Berry
Attorney

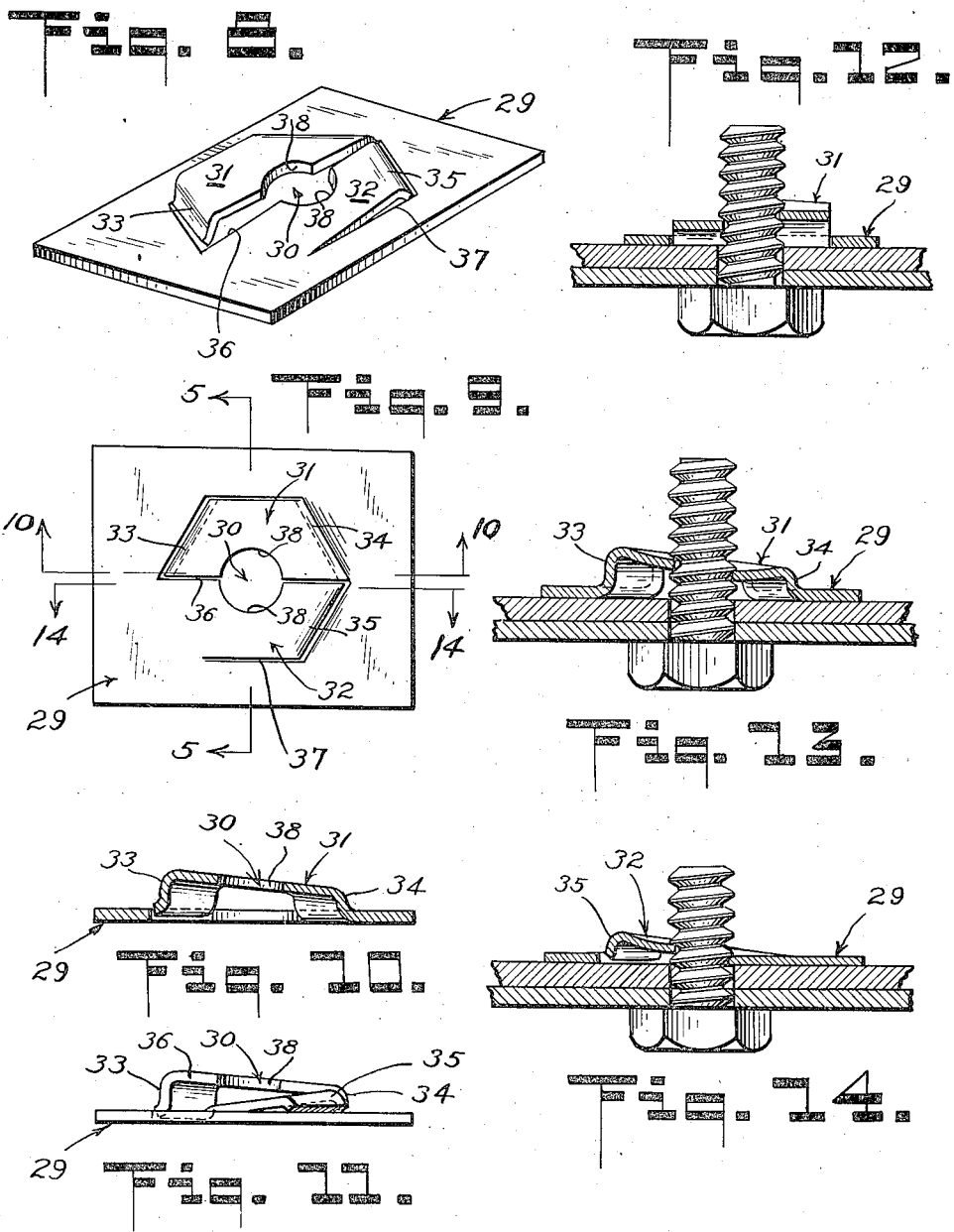

Patented Jan. 15, 1946

2,393,054

UNITED STATES PATENT OFFICE 2,393,054

SELF-LOCKING NUT

Eugene M. Morehouse, Tujunga, Calif., assignor to Adel Precision Products Corp., a corporation of California Application October 31, 1944, Serial No. 561,221

11 Claims. (Cl. 85—36)

This invention relates to self-locking nuts of the type embodying a plate-like sheet metal body having outwardly struck portion constructed and arranged to have tensioned and threaded engagement with a screw or bolt turned therebetween.

An object of the present invention is to provide a self-locking nut of the character described in which a more positive and reliable locking action is afforded by reason of a simple and easily provided construction and arrangement of portions of the bolt engaging elements of the nut and without adding parts or increasing the amount of material in the nut or increasing the cost of manufacture thereof.

Another object is to provide a self-locking nut of the character next above noted which is made stronger and more rugged and durable and given longer life by reason of the particular formation and arrangement of the bolt engaging elements thereof.

A further object of my invention is to provide a nut such as described in which the bolt engaging elements will be yieldingly forced under tension directly inwardly toward and bite into the bolt, when the latter is tightened, thereby locking the nut on the bolt.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Fig. 1 is a perspective view of a nut embodying my invention;

Fig. 2 is a top plan view of the nut;

Fig. 3 is a sectional view taken on the line 3—3 of Fig. 2;

Fig. 4 is a side elevation of the nut;

Fig. 5 is a sectional view of the nut taken on the line 5—5 of Fig. 2 but showing the nut as installed;

Fig. 6 is a sectional view similar to Fig. 3 but showing the nut as installed;

Fig. 7 is a sectional view taken on the line 7—7 of Fig. 4;

Fig. 8 is a perspective view of a modified form of my invention;

Fig. 9 is a top plan view of the nut shown in Fig. 8;

Fig. 10 is a cross sectional view taken on the line 10—10 of Fig. 9;

Fig. 11 is a side elevation of the nut shown in Fig. 8;

Fig. 12 is a sectional view taken on the line 12—12 of Fig. 9 showing the nut applied;

Fig. 13 is a sectional view corresponding to Fig. 3 showing the nut applied;

Fig. 14 is a sectional view taken on the line 14—14 of Fig. 9 showing the nut applied.

Referring to Figs. 1 to 7 inclusive of the accompanying drawings, it is seen that one form of nut embodying the present invention includes a plate-like substantially rectangular body portion 15 made of resilient sheet metal and subject to being readily die stamped into complete nut formation so that a bolt 16 or the like when turned in a central opening 17 in said body portion will have screw threaded engagement therewith as shown in Figs. 6 and 7.

In accordance with this invention two elongated bolt engaging elements or portions 18 and 19 are struck outwardly from the body portion in the form of arches at points intermediate the side and end edges of the body portion so as to lie side by side with the body portion proper forming a flat frame around such elements. The opposed longitudinal edges 20 of the elements 18 and 19 are separated from one another and the body portion by means of a slit or cut 21 extending along the median longitudinal line of the body portion with its ends spaced well inwardly and equidistantly from the end edges of the body portion. The outer longitudinal edges 22 of the elements 18 and 19 are shorter than edges 20 and are separated from the body by means of slits or cuts 23 which are parallel with the slit or cut 21 but spaced well inwardly from the end and side edges of the body portion.

Intermediate their ends the elements 18 and 19 are provided with semi-circular notches or recesses forming arcuate edge portions 24 which define the bolt receiving opening 17. In order that the edge portions 24 are disposed at the proper helical angle to have a tensioned and screw threaded engagement with the threads of the bolt, the elements 18 and 19 are oppositely inclined and differentially offset with respect to the plane of the body portion 15.

The element 18 is offset from the plane of the body portion 15 a greater extent than element 19 and at one end is provided with a connecting or web or bend portion 25 which extends substantially right angularly outward from the body portion. The element 18 is inclined from the portion 25 towards its other end where a similar web or bend portion 26 of lesser outward extent than the portion 25, joins the element 18 to the body portion.

The element 19 being offset a lesser extent, has an outwardly extended but relatively short web portion or bend 27 joining one end of such element to the body portion, and is inclined from this end to its other end which latter is substantially coplanar with the body portion and formed integral therewith on a diagonal line 28 extending between the slits 21 and the associated slit 23.

The two elements 18 and 19 are constructed and arranged so that they will be forced inwardly toward the bolt when being bowed or sprung toward the body portion upon the tightening of the bolt therein, so that the edges 24 will bite into the threads of the bolt and lock the nut against being loosened thereon. As here provided this is accomplished by having the outwardly struck web portions or bends 25, 26 and 27 as well as the joint line at 28 between the body and the element 19, extended at acute angles to the separating cut or slit 21 and slits 23. In other words the elements 18 and 19, each take the form of a trapezoid. This arrangement causes the elements 18 and 19 to bend or yield in directions which are normal to the diagonal bends 25, 26 and 27 thereof, as indicated in Fig. 2 by the small arrows.

Figs. 4 and 6 show how the elements 18 and 19 will be bowed inwardly upon tightening the bolt, it being noted that in being thus bowed the edges 24 will also be caused to bite into the bolt and effectively lock the nut thereon.

Referring now to Figs. 8 to 14 inclusive wherein a modified form of my invention is shown, it is seen that this form is made of a substantially rectangular and resilient sheet metal body portion 29 having a central bolt receiving opening 30 and provided with opposed outwardly struck elongated bolt engaging elements 31 and 32 of trapezoidal outline arranged side by side formed and disposed in the same manner as the elements shown in Figs. 1 to 7 except that they are tongue-like in that each has one end free instead of being integral at both ends with the body as in Figs. 1 and 2.

In other words, the element 31 has bend portions 33 and 34 and the element 32 a bend portion 35, which corresponds with the bends or webs 25, 26 and 27 but the bend portions 33 and 35 are separated from the body by diagonal cuts 36 and 37. Thus the bends 33 and 35 constitute the inwardly turned free ends of the tongue-like elements 31 and 32 and these ends will contact the structure against which the nut abuts to prevent turning of the nut relative thereto the angle of these ends causing corners thereof to bite into the structure A.

Inasmuch as the web or bend 34 extends at an acute angle to the longitudinal axis of the element 31, and the element 32 is joined to the body by a portion of the body extending diagonally between slits or cuts 36 and 37 of unequal length, as best shown in Fig. 10, it is seen that when the elements are flexed inwardly upon tightening the bolt 35 they also are forced laterally inwardly whereby the edge portions 38 will bite into the bolt and lock the nut thereon in the same manner as described in connection with the nut shown in Figs. 1 to 7.

While I have shown and described specific embodiments of my invention I do not limit myself to the exact details of construction set forth, and the invention embraces such changes, modifications and equivalents of the parts and their formation and arrangement as come within the purview of the appended claims.

I claim as my invention:

1. In a nut, a resilient sheet metal plate-like body portion, and elongated resilient elements struck out from the plane of one surface of said body portion so as to lie side by side, said elements having opposed side edge portions defining an opening in which a screw threaded member may be turned so as to have screw threaded tensioned engagement with said opposed edge portions, each of said resilient elements being joined to said body portion at spaced points along lines which are diagonal to the longitudinal axes of said elements.

2. In a nut, a resilient sheet metal body portion, resilient elongated bolt engaging elements struck out from the body portion so as to lie side by side with opposed side edge portions thereof constructed and arranged to receive therebetween and have screw threaded engagement with a bolt or screw, and spaced outwardly extending web portions joining each of said elements to said body portion, said web portions extending at acute angles to the longitudinal axes of said elements.

3. In a nut, a resilient sheet metal body portion, resilient elongated bolt engaging elements struck out from the body portion so as to lie side by side with opposed side edge portions constructed and arranged to receive therebetween and have screw threaded engagement with a bolt or screw, and outwardly extending web portions joining said elements to said body portion and extending at acute angles to the longitudinal axes of said elements, there being two such web portions connecting one of said elements with the body portion and one such web portion joining the other element to the body, said web portions being of differential outward extent whereby the elements are differentially outwardly offset from said body and inclined relative thereto.

4. In a nut, a resilient sheet metal body portion, and resilient elongated bolt engaging elements struck out from the body portion so as to lie side by side with opposed side edge portions constructed and arranged to receive therebetween and have screw threaded engagement with a bolt or screw, said elements being oppositely inclined, the opposed edges of said elements being of greater length than the outer edges thereof.

5. In a nut, a resilient sheet metal plate-like body portion, and elongated resilient elements struck out from the plane of one surface of said body portion so as to lie side by side and having opposed side edge portions defining an opening in which a screw threaded member may be turned so as to have screw threaded tensioned engagement with said opposed edge portions, said elements being formed so that portions thereof which join them to the body portion extend at acute angles to the side edges of said elements whereby upon flexing said elements toward the plane of the body portion they will bend or flex on lines which are at right angles to the portion which join them to the body portion.

6. In a nut, a body portion of resilient sheet metal, and bolt engaging elements in integral formation with said body portion and lying for the most part in outwardly offset relation to the plane of one side of the body portion in side by side relation to one another, said elements being trapezoidal and having certain parallel edges in opposed relation and provided with arcuate bolt engaging portions which define an opening for reception of a bolt, said arcuate bolt engaging portions being angularly disposed for a screw threaded and tensioned engagement with the body portion.

7. In a nut, a body portion of resilient sheet metal, and bolt engaging portions of trapezoidal formation struck from the body portion so as to lie for the most part in outwardly offset relation to the plane of one side of said body portion with certain parallel edges in opposed relation and provided between their ends with arcuate edge portions defining a bolt receiving opening and adapted for a threaded engagement with a bolt, said bolt engaging portions being in the form of arches having their ends in integral formation with the body portion and adapted to be bowed inwardly toward the body portion when the bolt is tightened therebetween.

8. In a nut, a body portion of resilient sheet metal, and bolt engaging portions of trapezoidal formation struck from the body portion so as to lie for the most part in outwardly offset relation to the plane of one side of said body portion with certain parallel edges in opposed relation and provided between their ends with arcuate edge portions defining a bolt receiving opening and adapted for threaded engagement with a bolt, said bolt engaging portions being in the form of arches having their ends in integral formation with the body portion and adapted to be bowed inwardly toward the body portion when the bolt is tightened therebetween, said bolt engaging portions being oppositely inclined so as to dispose said arcuate edge portions at the proper helical angle for threaded engagement with the bolt.

9. In a nut, a body portion of resilient sheet metal, and bolt engaging portions of trapezoidal formation struck from the body portion so as to lie for the most part in outwardly offset relation to the plane of one side of said body portion with certain parallel edges in opposed relation and provided between their ends with arcuate edge portions defining a bolt receiving opening and adapted for a threaded engagement with a bolt, said bolt engaging portions having certain ends formed integral with the body and the other ends free so that said bolt engaging portions are in the form of trapezoidal spring tongues lying side by side.

10. In a nut, a body portion of resilient sheet metal, and bolt engaging portions of trapezoidal formation struck from the body portion so as to lie for the most part in outwardly offset relation to the plane of one side of said body portion with certain parallel edges in opposed relation and provided between their ends with arcuate edge portions defining a bolt receiving opening and adapted for a threaded engagement with a bolt, said bolt engaging portions being in the form of arches having their ends in integral formation with the body portion and adapted to be bowed inwardly toward the body portion when the bolt is tightened therebetween, one of said bolt engaging portions being offset a greater extent than the other bolt engaging portion and inclined relative thereto to dispose said arcuate edge portions at angles such that they will have a tensioned and screw threaded engagement with the bolt.

11. In a nut, a resilient sheet metal plate-like body portion, and elongated resilient elements struck out from the plane of one surface of said body portion so as to lie side by side, said elements having opposed side edge portions defining an opening in which a screw-threaded member may be turned so as to have screw-threaded tensioned engagement with said opposed edge portions, each of said elongated resilient elements having its end portions in continuity with said body portion along lines which are diagonal to its longitudinal axis and its outer edge portion separated from said body by a slit.

EUGENE M. MOREHOUSE.